(12) United States Patent
Nandy et al.

(10) Patent No.: US 8,095,673 B2
(45) Date of Patent: Jan. 10, 2012

(54) GENERIC FORMAT FOR EFFICIENT TRANSFER OF DATA

(75) Inventors: Sagnik Nandy, Sunnyvale, CA (US); David White, Santa Clara, CA (US); Chao Cai, Mountain View, CA (US); Hui Sok Moon, Campbell, CA (US); Simon Wang, San Jose, CA (US); Matthew Jones, Mountain View, CA (US); Ashok Babu Amara, Mountain View, CA (US); Lik Mui, Hayward, CA (US)

(73) Assignee: Google Inc., Mountain View, CA (US)

( * ) Notice: Subject to any disclaimer, the term of this patent is extended or adjusted under 35 U.S.C. 154(b) by 262 days.

(21) Appl. No.: 12/334,298

(22) Filed: Dec. 12, 2008

(65) Prior Publication Data

US 2009/0157898 A1 Jun. 18, 2009

Related U.S. Application Data

(60) Provisional application No. 61/013,518, filed on Dec. 13, 2007.

(51) Int. Cl.
*G06F 15/16* (2006.01)
(52) U.S. Cl. ........................... 709/229; 709/230
(58) Field of Classification Search ............ 709/229, 709/230
See application file for complete search history.

(56) References Cited

U.S. PATENT DOCUMENTS

| 5,752,245 | A | * | 5/1998 | Parrish et al. ................... 1/1 |
| 5,946,702 | A | | 8/1999 | Miyazaki |
| 6,397,263 | B1 | * | 5/2002 | Hancock et al. ............ 719/322 |
| 6,751,624 | B2 | | 6/2004 | Christal et al. |
| 7,047,525 | B2 | * | 5/2006 | Prunty et al. ............... 717/137 |
| 7,103,596 | B2 | | 9/2006 | Abe et al. |
| 2001/0012007 | A1 | * | 8/2001 | Breuer ............................ 345/340 |
| 2001/0037266 | A1 | * | 11/2001 | Schroeder ....................... 705/27 |
| 2004/0015891 | A1 | * | 1/2004 | Arellano-Payne et al. ... 717/137 |
| 2007/0067157 | A1 | * | 3/2007 | Kaku et al. ..................... 704/10 |
| 2010/0299434 | A1 | * | 11/2010 | Hanson et al. ................ 709/224 |

FOREIGN PATENT DOCUMENTS

JP 2002-259370 9/2002

OTHER PUBLICATIONS

International National Search Report and Written Opinion, PCT/US2008/086717, Dated May 27, 2009.

* cited by examiner

*Primary Examiner* — Patrice Winder
*Assistant Examiner* — Ebrahim Golabbakhsh
(74) *Attorney, Agent, or Firm* — Fish & Richardson P.C.

(57) ABSTRACT

Methods, systems and apparatus, including computer program products, for transferring, receiving, and storing multiple element data in a string of characters. Multiple data elements are sent in a string of delimited characters and have respective project identifiers, data types, and index numbers used to extract and store the data elements at a receiving computer.

20 Claims, 5 Drawing Sheets

GENERIC FORMAT FOR EFFICIENT TRANSFER OF DATA

RELATED APPLICATION

This application claims a benefit of priority from U.S. Provisional Patent Application No. 61/013,518, filed Dec. 13, 2007, which is incorporated herein by reference in its entirety.

BACKGROUND

This specification relates to data transfer formats.

Computers interconnected over a network can communicate using a variety of protocols. A given protocol can support any number of data encoding formats. Hypertext transfer protocol (HTTP), for example, can be used to transfer information from one computer to another. To successfully transfer information from a transmitting computer to a receiving computer, an encoding format is established so that data encoded by the sender can be decoded by the recipient.

To transmit multiple data elements over a network for receipt at a computer, the recipient computer and the transmitting computer use the same data encoding format so that transmitted data can be successfully parsed and interpreted by the recipient. Any number of formats can be established, but in order to limit the bandwidth required to transfer a given amount of data, it is desirable to limit the amount of overhead introduced by the chosen format. To transfer multiple-element character data (multiple variables represented by ASCII text, for example) transfer formats generally utilize one or more delimiter characters to separate respective variable elements. A parsing program at the recipient computer can then, based on the chosen data encoding format, extract the data and assign it to the correct variables.

Ideally, a given encoding format is flexible so that changes, e.g., the inclusion of one or more new variables can be handled by the encoding architecture without requiring substantial (or any) changes to the underlying code. Careful selection of the one or more delimiters and the basic format for a given encoding scheme can therefore enhance the efficiency and usefulness of the data encoding format.

SUMMARY

In general, one aspect of the subject matter described in this specification can be embodied in methods that include the actions of receiving a string of characters, scanning the string to locate a global parameter, reading a first project identifier following the global parameter in the string, reading a first group of two or more delimited data elements following the first project identifier in the string, the data elements having respective index numbers, storing the data elements in association with the first project identifier and the respective index value, reading a second project identifier following the first project identifier in the string, reading a second group of two or more delimited data elements following the second project identifier in the string, the data elements having respective index numbers, and storing the data elements in association with the second project identifier and the respective index value.

In particular implementations, the string is received as a suffix to a URL in an HTTP request. The data elements of the string can include web analytics tracking data and be delimited by a character that does not require an escape sequence in use in a URL. The data elements can be delimited, for example, by an asterisk. A data type of the data elements can be indicated implicitly by a data type enumeration order of keys then values and/or explicitly by a data type identifier immediately preceding a set of parentheses enclosing a subgroup. Index numbers of a subgroup of data elements can start at an initial value and increase by one for each proceeding data element unless explicitly indicated otherwise by an index number followed by an exclamation point.

Other embodiments include corresponding systems, apparatus, and computer program products.

Particular embodiments of the subject matter described in this specification can be implemented to realize one or more of the following advantages. The data transfer format is flexible in that data elements can be added with minimal or no changes to computer program code of parsing and storage architectures being required. The data transfer format is compact to minimize transfer overhead and increase the efficiency of data transfer operations using the format.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
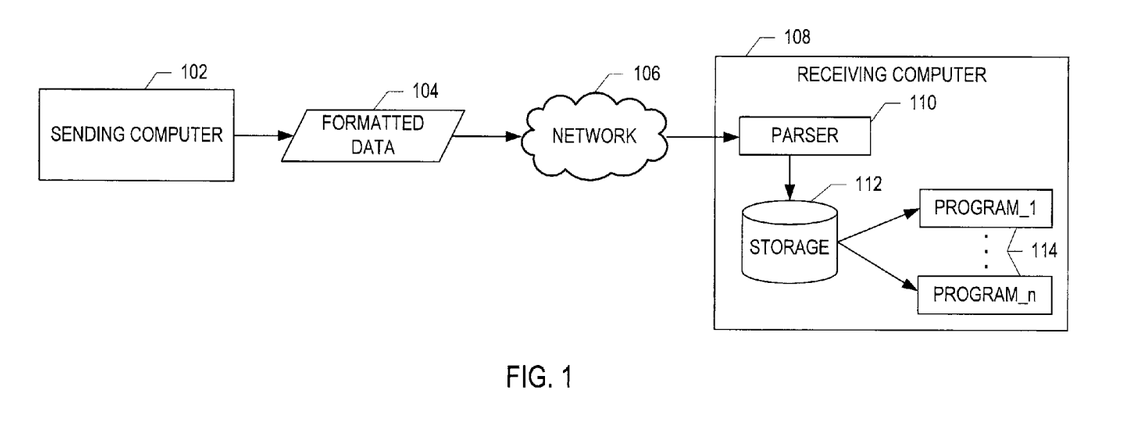
FIG. 1 is a block diagram of an example environment for transferring formatted data over a network.

FIG. 1 is a block diagram of an example environment 100 for transferring formatted data 104 over a network 106. A sending computer 102 sends formatted data 104 over network 106 to a receiving computer 108. A parser 110 of the receiving computer 108 reads the formatted data 104 to extract one or more component elements from the formatted data 104 for storage in a datastore 112. For example, the parser can extract one or more strings and/or integers from the formatted data as directed by the format used to transfer the data for storage into one or more defined variables for use with programs 114.

Figure 2:
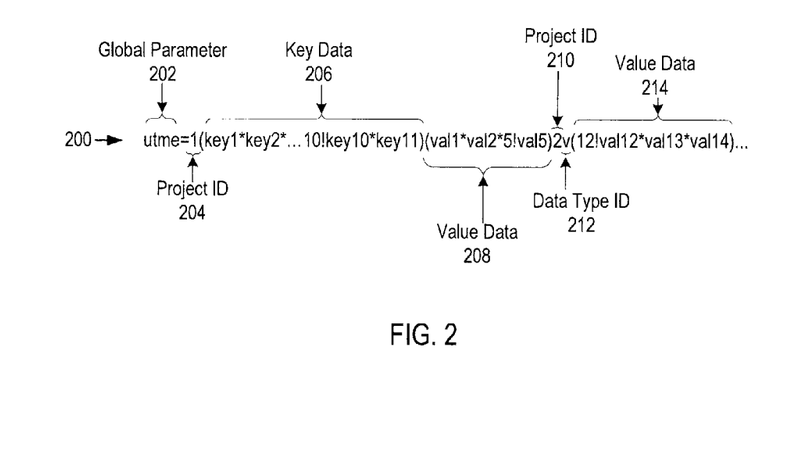
FIG. 2 is an example format for transferring data between two or more computers.

FIG. 2 is an example format 200 for transferring data between two or more computers. The example data format 200 can be used, for example, to transfer any number data elements belonging to any number of data types using a series of characters. In some implementations, the characters transferred are ASCII characters. The example data format 200 can be used to send the formatted data 104 of FIG. 1. The data format 200 shown includes data elements belonging to two data types: keys and values. In the example data format 200, the key data type is used to transfer strings of alphabetic characters. The value data type is used to transfer numeric characters. Although the example format shown merely includes two data types, the format can support additional data types. For example, data types of double (for floating point numbers) can be transferred using the example format.

The example format begins with a global parameter 202. The global parameter shown is "utme", but the global parameter can be any character or string of characters whose appearance in a string of data is unique in a series of received characters so that it is recognized as the start of a data transfer corresponding to the example format. A string parser, the parser 110 for example, that encounters the global parameter followed by an equal sign ("=") can be programmed to recognize the beginning of a data transfer according to the example format and parse the information that follows accordingly.

The example data format 200 includes project identifiers, data type identifiers, and data groups. A project identifier (project ID) 204 is used to denote that the subsequent data belongs to a specified project. For example, a number of project IDs can be assigned to respective projects. Keys and values received for a given project that are received, for example, at a parsing program, are stored in association with that project to distinguish the data from that of other projects to avoid variable collision between two or more projects. In the example format 200, data that follows the project ID 204 can be considered by a parser to correspond to that project until another project ID is encountered. In some implementations, an initial project ID is required to follow the global parameter and equals sign. A parser reading data sent using the example format can be programmed to treat any numeric characters located outside of parentheses "( )" as a project ID.

Parentheses "( )" are used in the example format to enclose groups of data. Within the parentheses the data elements correspond to one of the data types supported by the format. The supported data types can be given an enumeration order corresponding to an order to which a parser, absent an explicit indication in the received data, will assign data elements encountered within the format. In the example format 200, the enumeration order can be keys then values, meaning that unless explicitly indicated in the data, a first group of data elements will be considered by a compatible parser to be a group of keys, and the next group of data elements will be assumed to be a group of values.

The example format 200 does not include an explicit indication that the first group of data elements corresponds to any given data type. Therefore, according to an enumeration order of keys then values, the first encountered group of data elements is to be considered a group of keys. The key data 206 in the first data group includes multiple elements delimited by asterisks (*). Unless explicitly indicated in the data, the first encountered key element is treated as belonging to an initial index value. Subsequently encountered key elements in the group are treated as belonging to the previous index value plus one. An explicit index is designated in the example format with an exclamation point "!". Upon encountering an exclamation point, a compatible parser will assign the data element following the exclamation point to the index indicated by the numeric characters preceding the exclamation point. In the example format 200, the key data 206 includes an exclamation point preceded by "10" to indicate that the key element following the exclamation point should be assigned to the key index 10.

The next data group following the key data group 106 is, according to the enumeration order, a value data group. The value data 108 includes three data elements delimited by asterisks. A compatible parser processes value data elements in a manner similarly to that of key elements. That is, unless explicitly indicated in the data, a first element is assigned to a first index, and subsequent elements are assigned to the index of the previous element plus one. An index is explicitly indicated using an exclamation point. The value data 208 includes an exclamation point preceded by "5". The value element following the exclamation point is therefore assigned to the value index 5.

The value data 208 is followed by a project ID 210. The project ID 210 of "2" indicates that the data groups enclosed in brackets following the project ID 210 are to be assigned to the project having the project ID of "2". The data type ID 212 of "v" explicitly indicates that the next data group is a value data group. The data type ID 212 is followed by value data 214. The first data element in the value data 214 is explicitly assigned to the index value of 12 and the subsequent elements are assigned to the index of the previous element plus one.

The example data format 200, unlike many transfer formats, does not include variable names (variable names followed by respective values, for example). This substantially decreases the data transfer overhead inherent in the data format 200 as compared to formats that include variable names. The example data format 200 also does not use formatting characters that require the use of an escape sequence when used in conjunction with a URL (for example, concatenated to the end of a URL). Characters that require URL escaping incur a size penalty when used in conjunction with a URL. For example, a three character escape code would be needed to represent a single character if URL escaping is required. The delimiters of the example data format 200 do not require the use of an escape code, thereby increasing the efficiency of the format.

In some implementations, the data format 200 is used to transfer data to a web analytics system to record one or more web page parameters, e.g., visitor interactions with one or more web pages.

Figure 3:
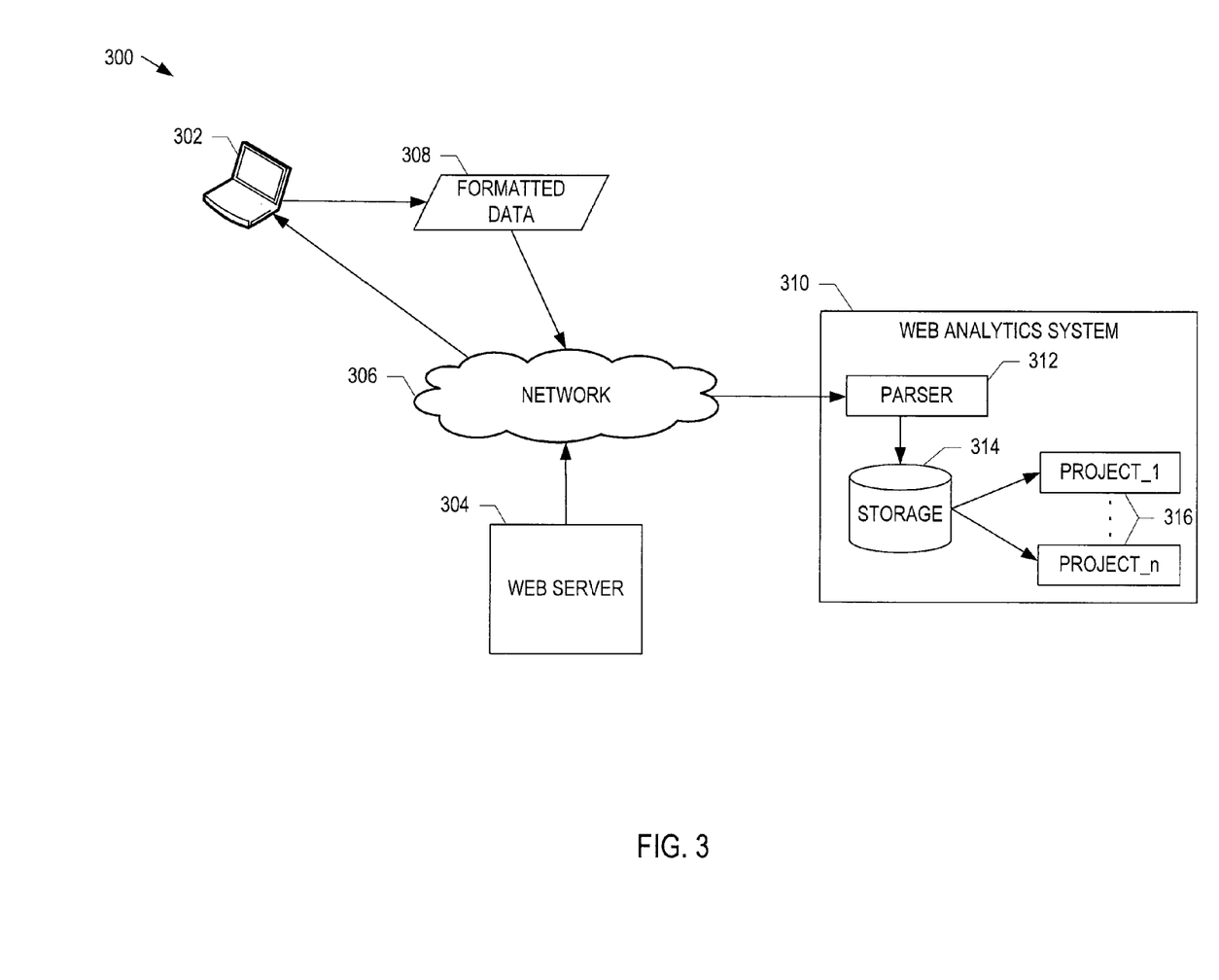
FIG. 3 is an example environment for using the example data format for use with a web analytics system.

FIG. 3 is an example environment 300 for using the example data format 200 with a web analytics system 310. A user of the computer 302 can direct a web browser program on the computer 302 to a web site served by the web server 304. The web server 304 can respond by sending one or more web pages to the computer 302 for display to the user, with the computer 302 functioning as a user interface device for the user to interact with the one or more web pages. The code of the transferred web pages can include one or more scripts that, depending on user interactions with the web page, instruct the web browser of the computer 302 to send formatted data 308 to the web analytics system 310. For example, HTML of a web page served by the web server 304 can include embedded Javascript that causes data formatted according to the example data format 200 to be transferred over the network 306 to the web analytics system 310. In some implementations, one or more HTTP requests are sent to the web analytics system from the computer 302 with a suffix formatted according to the example data format 200. For example, an HTTP request can include a URL request appended with a question mark "?" followed by a string of characters formatted according to the data format 200.

A parser 312 of the web analytics system can parse the URL and the appended information. The parser extracts keys and values included in the appended string and stores the extracted keys and values in association with their respective project IDs. In some implementations, the received data is stored in association with a hit identifier (hit ID), as a unique key, where each receipt of formatted data is considered a hit. In some implementations, the received data is stored in association with a visit identifier (visit ID, also referred to as a session identifier or session ID). A set of hits can be attributed to a user visit to a web site if, for example, all of the hits correspond to user interactions with the web site that meet predetermined conditions. For example the conditions can include that hits all corresponding to user interactions that occur during a period in which the user does not direct a web browser to a different web site, and/or during a period during which the user does not log off of from the website (if for example the web site issues the user a login and password). Another example condition can be that all of the hits assigned to a given session are received before a threshold delay has occurred since the last receipt of a hit.

Following extraction of the data from the data format, the extracted data can be stored in a datastore 314 where the extracted data elements are stored according to the rules of the data format. That is, keys and values are stored in association with their project ID, data type ID, and index number as indicated by their placement in a formatted string. One or more projects 316 can access the stored data to, for example, provide web analytics reporting information.

Figure 4:
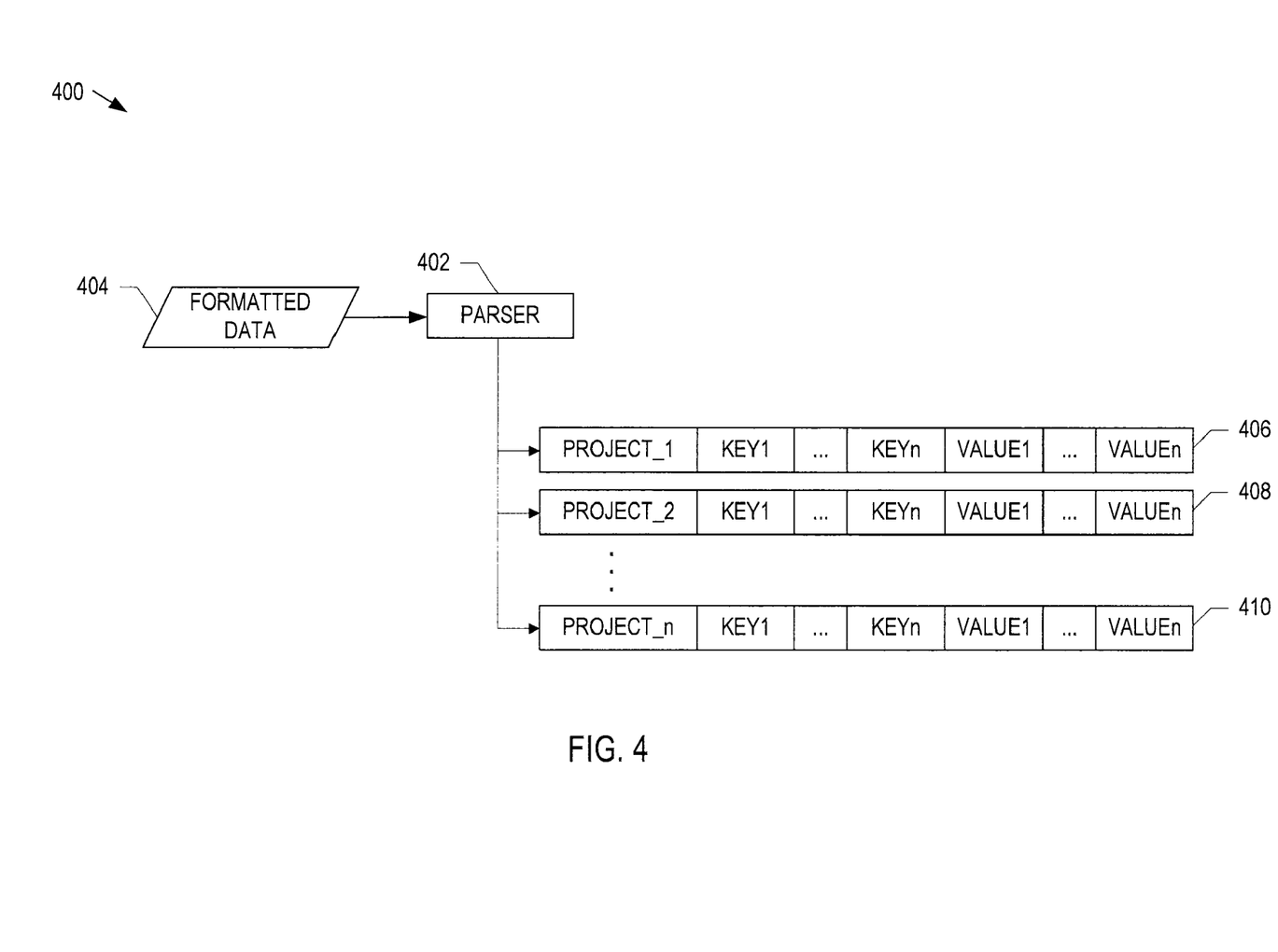
FIG. 4 is a block diagram of an example parser for extracting data elements for multiple project IDs from formatted data.

FIG. 4 is a block diagram of an example parser 402 extracting data elements for multiple project IDs from formatted data 404. The parser receives formatted data 404 and extracts the data elements of the formatted data to generate one or more records, e.g., using the extracted project data 406, 408, and 410. As described above, the data elements can also be stored in association with a session ID and/or a hit ID.

In some implementations, a project ID corresponds to a project and/or team using the web analytics system to track user interactions with one or more web pages. The web analytics system can assign a respective project ID to each project and/or team using the analytics system. The system stores the data as generic keys and values. To access the data, for example, a given team keeps track of their variable mapping. That is, the team is responsible for knowing what the data stored in the key and value indices of their project represents. This follows from the lack of variable names transmitted with the data elements in the data format 200. As described above the lack of variable names in the data format permits the format to remain compact and efficient. An additional benefit of the generic data elements is that a given team can add new variables to their project, and/or modify their variable mapping (also referred to as schema) with little or no changes (e.g., code changes and recompiling) being required to the parsing or storage architecture.

The data format 200 provides a standard format for transmitting hits from a user's web browser for any number of analytics tracking projects. In some implementations, a web analytics system storing data elements for multiple projects supports cross-project reporting. For example, if one project team is interested data regarding a type of user interaction and/or web page parameter that has not been tracked by their team, but is being tracked by another team using the web analytics system to track hits, the first project team can construct a query of the data to report both their own tracked data in combination with data tracked for the other project.

Figure 5A:
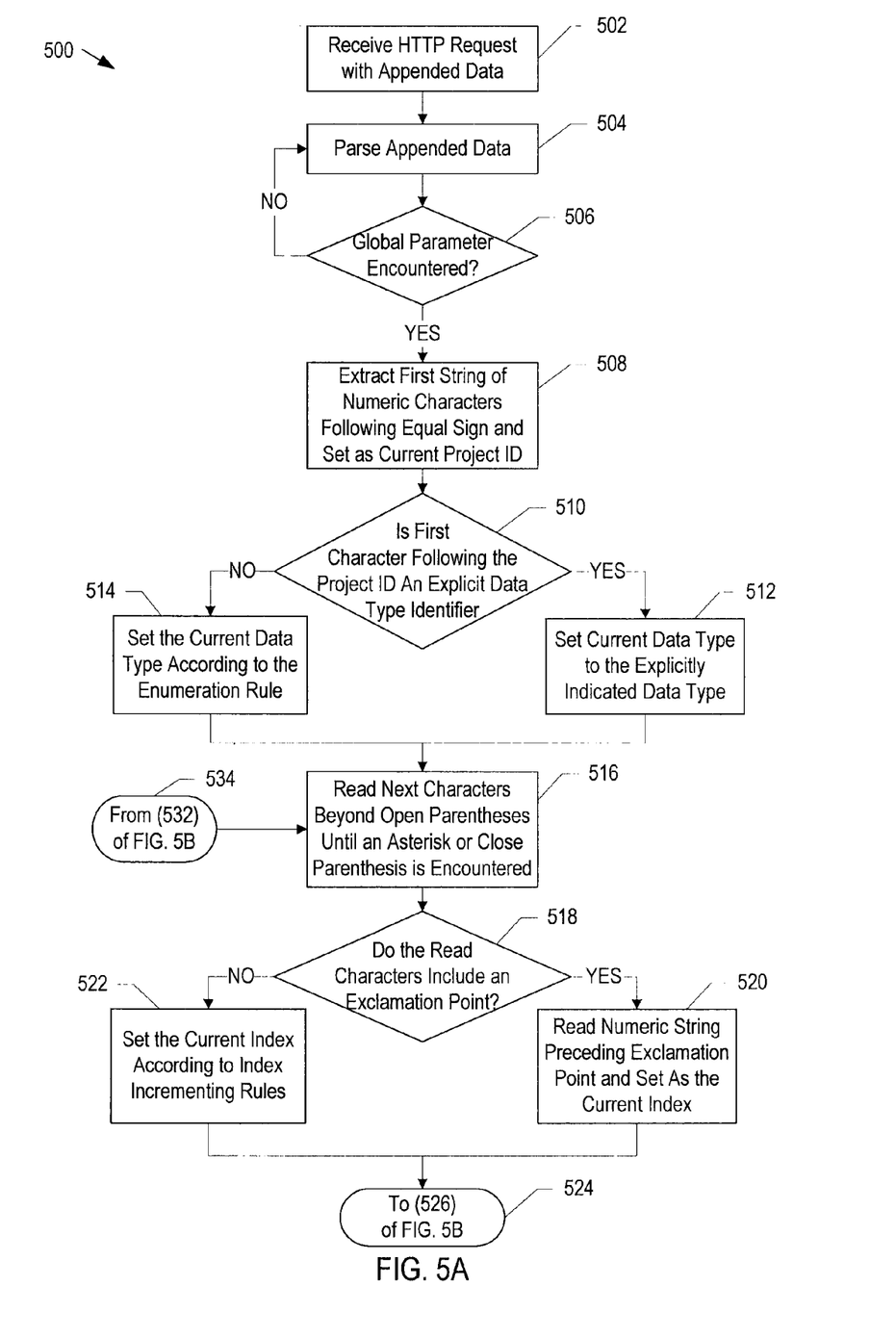
FIGS. 5A and 5B together are a flowchart of an example method for parsing data appended to a URL for use with a web analytics system.
Figure 5B:
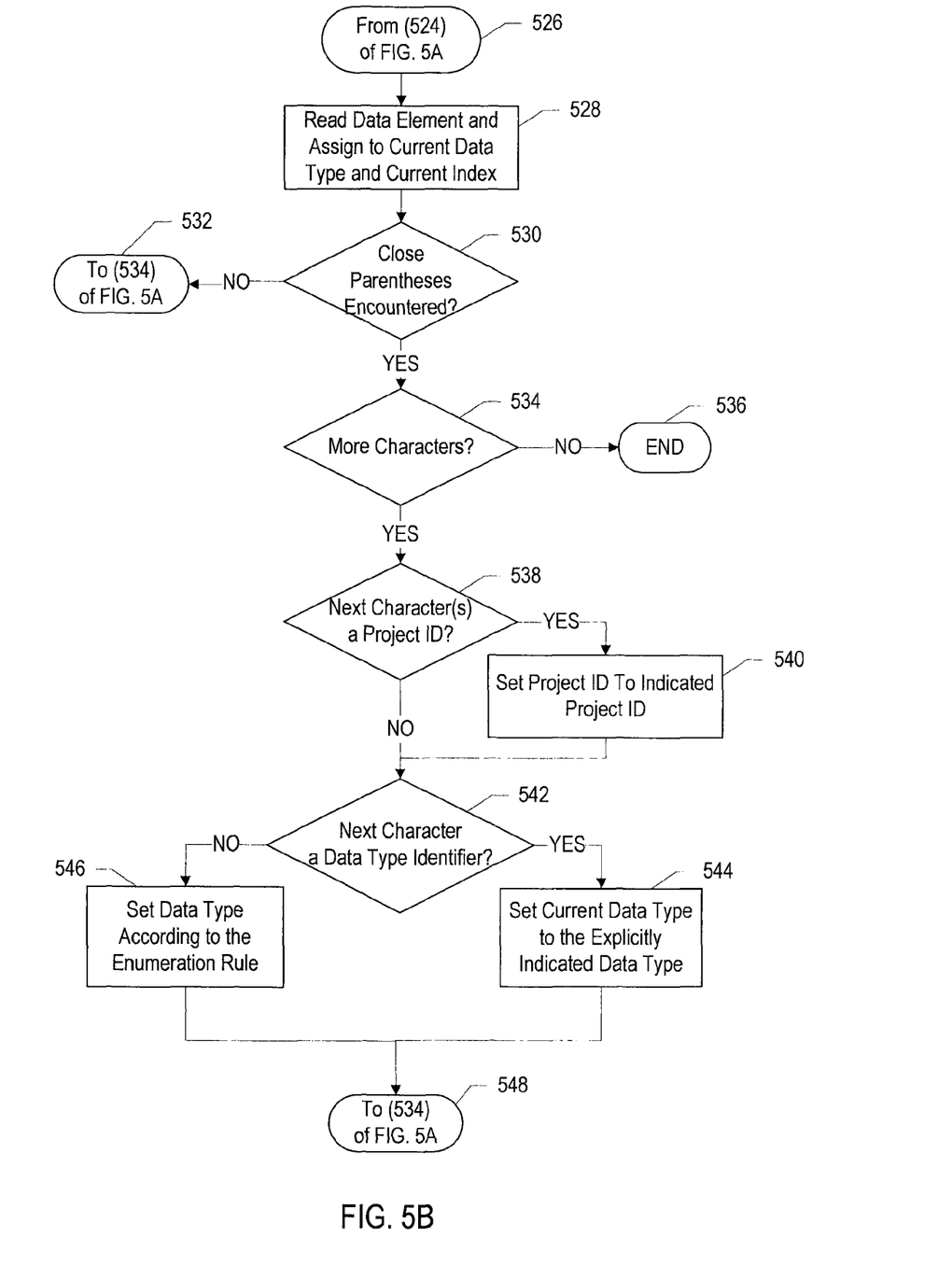

FIGS. 5A and 5B together are a flowchart of an example method 500 for parsing data appended to a URL for use with a web analytics system. The method is described with respect to a system implementing the method. An HTTP request is received (502). A received HTTP request can include, for example, a URL with appended data in a format consistent with the example format 200. In some implementations, the HTTP request can be initiated by client side Javascript embedded in a web page served to a web browser of a user computer. Interactions of the user with the web page using controls of the web browser (for example, moving a mouse pointer over an image or area on the page, or clicking on one or more areas of the web page) can cause the embedded Javascript to initiate an HTTP request from a web server of a web analytics system. In some implementations, the Javascript requests an image having a minimal file size. For example, the HTTP request can be a request for a GIF formatted image having dimensions of one pixel by one pixel.

A parser reads data appended to the HTTP request (504). The data can be, for example, ASCII formatted characters that form a string of characters following a URL. The parser reads the appended data until the global parameter is encountered (506). The parser extracts a first string of numeric characters following the global parameter and an equal sign. The system uses the numeric characters as a current project ID (508). The character following the project ID is checked to determine if the character is an explicit data type identifier (510). If an explicit data type identifier is found, a current data type is set to the data type indicated (512). If an explicit data type identifier is not found, the current data type is set according to an enumeration rule (514) that can, for example, be based on an order in which the data type appears in the string such as the enumeration order described above.

The system proceeds to read a string of characters beyond an open parenthesis character until an asterisk or close parenthesis is encountered (516). The system examines the read characters to determine if they include an exclamation point (518). If the characters include an exclamation point, the system reads a numeric string preceding the exclamation point and sets this number as a current index (520). If the characters do not include an exclamation point, the current index is set according to the index incrementing rule (i.e., the index is set to an initial index number and incremented for each data element thereafter) (522). The method proceeds to FIG. 5B. The system assigns the data element read in the string of characters before the asterisk to the current project, data type, and index (528).

If a close parenthesis character was not encountered (530), the method loops back to 534 of FIG. 5A to read a next string of characters up to an asterisk or close parenthesis. If a close parenthesis was encountered then the current group of data elements is at an end and the system checks to see if there are more characters to be processed (534). If there are no more characters, the method ends (536). If there are additional characters, the system checks the next characters to determine if the characters are a project ID (538). If the characters are a project ID the current project ID is set to the project ID indicated by the characters (540). The system proceeds to determine if the next character is a data type identifier (542). If the next character is a data type identifier, the current data type is set to the data type explicitly indicated by the identifier (544). If the next character is not a data type identifier, the system sets the current data type according to the data type enumeration rule (546), and the system proceeds to return to 534 of FIG. 5A to read the next data element.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers configured to interact with a client device and operable to:
   receive a string of characters from the client device, the string including a first project identifier corresponding to a first project and a second project identifier corresponding to a second project;
   scan the string to locate a global parameter;
   read the first project identifier following the global parameter in the string;
   read a first group of two or more delimited data elements following the first project identifier in the string, the data elements having respective index numbers and including web analytic tracking data associated with the first project;
   store the data elements in association with the first project identifier and the respective index value;
   read the second project identifier following the first group of two or more delimited data elements in the string;
   read a second group of two or more delimited data elements following the second project identifier in the string, the data elements having respective index numbers and including web analytic tracking data associated with the second project; and store the data elements in association with the second project identifier and the respective index value.

2. The system of claim 1, wherein the string is received as a suffix to a URL in an HTTP request.

3. The system of claim 1, wherein the data elements are delimited by a character that does not require an escape sequence in a URL.

4. The system of claim 1, wherein the data elements are delimited by an asterisk.

5. The system of claim 1, wherein the first group of two or more delimited data elements includes a subgroup of key data elements enclosed inside a first set of parentheses and a subgroup of value data elements enclosed inside a second set of parentheses.

6. The system of claim 5, wherein a data type of the subgroup of key data elements and a data type of the subgroup of value data elements are indicated by a data type enumeration order of keys then values.

7. The system of claim 5, wherein a data type of at least one of the subgroup of key data elements and the subgroup of value data elements is indicated explicitly by a data type identifier immediately preceding the set of parentheses enclosing the subgroup.

8. The system of claim 5, wherein the respective index numbers of data elements are unique within the subgroup of key data elements, and unique within the subgroup of value data elements.

9. The system of claim 8, wherein the index numbers of the subgroup of key data elements start at an initial value and increase by one for each proceeding data element unless explicitly indicated otherwise by an index number followed by an exclamation point.

10. The system of claim 1, further comprising: a web server operable to send hypertext markup language to the client device, the hypertext markup language comprising one or more scripts operable to instruct a web browser of the client device to send an image request to the one or more computers, the image request including a suffix comprising the string of characters.

11. A method for processing a string of characters including multiple elements of web page tracking data comprising:
receiving a string of characters from a client device, the string including a first project identifier and a second project identifier;
scanning the string to locate a global parameter;
reading the first project identifier following the global parameter in the string;
reading a first group of two or more delimited data elements following the first project identifier in the string, the data elements having respective index numbers and including web analytic tracking data associated with the first project;
storing the data elements in association with the first project identifier and the respective index value;
read the second project identifier following the first group of two or more delimited data elements in the string;
reading a second group of two or more delimited data elements following the second project identifier in the string, the data elements having respective index numbers and including web analytic tracking data associated with the second project; and
storing the data elements in association with the second project identifier and the respective index value.

12. The method of claim 11, wherein the string is received as a suffix to a URL in an HTTP request.

13. The method of claim 11, wherein the data elements are delimited by a character that does not require an escape sequence in use in a URL.

14. The method of claim 11, wherein the data elements are delimited by an asterisk.

15. The method of claim 11, wherein the first group of two or more delimited data elements includes a subgroup of key data elements enclosed inside a first set of parentheses and a subgroup of value data elements enclosed inside a second set of parentheses.

16. The method of claim 15, wherein a data type of the subgroup of key data elements and a data type of the subgroup of value data elements are indicated by a data type enumeration order of keys then values.

17. The method of claim 15, wherein a data type of at least one of the subgroup of key data elements and the subgroup of value data elements is indicated explicitly by a data type identifier immediately preceding the set of parentheses enclosing the subgroup.

18. The method of claim 15, wherein the respective index numbers of data elements are unique within the subgroup of key data elements, and unique within the subgroup of value data elements.

19. The method of claim 18, wherein the index numbers of the subgroup of key data elements start at an initial value and increase by one for each proceeding data element unless explicitly indicated otherwise by an index number followed by an exclamation point.

20. A computer storage device encoded with computer program instructions that when executed by one or more computers cause the one or more computers to perform operations comprising:
receiving a string of characters from a client device, the string including a first project identifier and a second project identifier;
scanning the string to locate a global parameter;
reading the first project identifier following the global parameter in the string;
reading a first group of two or more delimited data elements following the first project identifier in the string, the data elements having respective index numbers and including web analytic tracking data associated with the first project;
storing the data elements in association with the first project identifier and the respective index value;
read the second project identifier following the first group of two or more delimited data elements in the string;
reading a second group of two or more delimited data elements following the second project identifier in the string, the data elements having respective index numbers and including web analytic tracking data associated with the second project; and
storing the data elements in association with the second project identifier and the respective index value.

* * * * *

UNITED STATES PATENT AND TRADEMARK OFFICE
CERTIFICATE OF CORRECTION

PATENT NO. : 8,095,673 B2  
APPLICATION NO. : 12/334298  
DATED : January 10, 2012  
INVENTOR(S) : Sagnik Nandy et al.

Page 1 of 1

It is certified that error appears in the above-identified patent and that said Letters Patent is hereby corrected as shown below:

Column 9
Line 55, delete "read" and insert --reading--

Column 10
Line 50, delete "read" and insert --reading--

Signed and Sealed this
Sixth Day of March, 2012

David J. Kappos
*Director of the United States Patent and Trademark Office*